(No Model.)
W. E. SARGENT.
PROCESS OF AND MEANS FOR MAKING TUBES FROM CELLULOID AND OTHER PLASTIC MATERIAL.
No. 270,342. Patented Jan. 9, 1883.
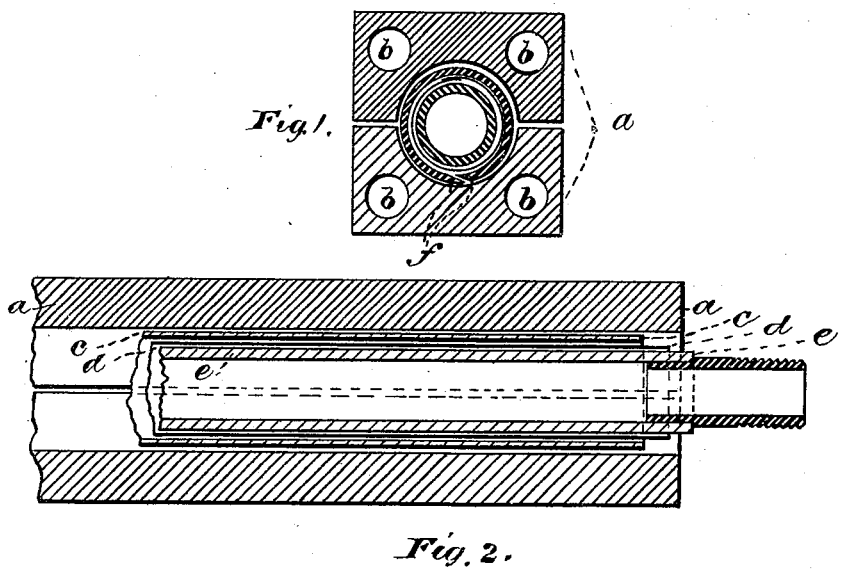
Attest:
Charles H. Cee
Chas. Herr
Inventor:
Willard E. Sargent
by O. Drake, Atty.

UNITED STATES PATENT OFFICE.

WILLARD E. SARGENT, OF NEWARK, NEW JERSEY.

PROCESS OF AND MEANS FOR MAKING TUBES FROM CELLULOID AND OTHER PLASTIC MATERIAL.

SPECIFICATION forming part of Letters Patent No. 270,342, dated January 9, 1883.

Application filed October 9, 1882. (No model.)

*To all whom it may concern:*

Be it known that I, WILLARD E. SARGENT, a citizen of the United States, residing at Newark, in the county of Essex and State of New Jersey, have invented certain new and useful Improvements in Processes of and Means for Making Tubes from Celluloid and other Plastic Material; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a cross-section, and Fig. 2 is a longitudinal sectional view.

The more especial object of this invention is to form tubes of plastic material—such as celluloid, lignoid, coraline, or other allied substances—so that any combinations of colors or designs upon or in the rough material will be preserved through the process of forming the tubing.

Heretofore tubes of plastic material have been formed by forcing the said material through a nozzle; but by this process it was impossible to produce a tube having a mottled appearance in imitation, for example, of tortoise-shell and malachite. The process of forcing the plastic material through a nozzle gave to the tube a striped appearance, the mottles in the unformed matter being distorted into longitudinal lines in the tubes, whereby the latter are rendered unmarketable as imitations. These objections my invention overcomes; but I do not wish to be understood as limiting my invention to its employment with mottled stock.

In carrying out my invention I arrange around an elastic tube, $e$, suitably connected at each end to allow steam or hot water to pass therethrough, a thin sheet of metal, $d$, the edges of which overlap, as shown in Fig. 1. The object of said sheet is to prevent the celluloid or plastic material from adhering to the elastic tubing $e$ when they are under the influence of heat and pressure. Over said sheet of metal is arranged a roll of sheet plastic material, $c$, having the edges thereof, $f$, covered with cement, by which they are united when the heat and pressure are brought to bear. The said edges are beveled and overlap, as shown in the drawings. The whole is next placed in a die, $a$, provided with steam or hot-water passages $b$. Steam or hot water, under pressure, is then applied to the inside of the elastic tube $e$, which causes the same to expand and forces the plastic material $c$ against the walls of the die and unites the edges to form a tube.

Should I desire I can reverse the relation of the parts, the die $a$ being in the center, in which case it would be a simple metallic tube, the plastic material being rolled around the same, with its edges beveled and overlapping the metallic sheet next in turn, and finally the elastic tube receiving the pressure from the outside.

I am aware that in the process of vulcanizing rubber tubing internal pressure, in conjunction with an outer metallic tube or envelope, has been applied to keep the tube distended during the vulcanizing process, and therefore these features broadly I do not wish to be understood as claiming; but, however, I am not aware that an external metallic envelope or die has been used in combination with an inner elastic die or tube acting upon a third tube of plastic material to form the same, as hereinbefore set forth, whereby the steam, which would interfere with or prevent a proper union of parts, is kept from contact with the said plastic material. Neither am I aware that a metallic sheet has ever been used to separate, as herein set forth, an elastic pressing-tube from a plastic tube receiving the pressure, whereby the two are prevented from uniting under heat and pressure, and the plastic tube is given a polished surface.

What I claim is—

1. The process of forming tubes from sheets of plastic material—to wit, of arranging said sheets in a tubular form with the edges thereof overlapping between an outer metallic die and an inner steam-containing tube, whereby the steam is excluded from contact with said plastic tube, and uniting said edges by internal pressure, as herein set forth.

2. In combination, in a device for forming tubes from sheets of plastic material, a die, an elastic tube, and a sheet, $d$, of metal, all arranged and operating substantially as set forth and shown.

In testimony that I claim the foregoing I have hereunto set my hand this 2d day of October, 1882.

WILLARD E. SARGENT.

Witnesses:
OLIVER DRAKE,
CHARLES H. PELL.